United States Patent [19]

Martin et al.

[11] 4,058,791

[45] Nov. 15, 1977

[54] METHOD AND APPARATUS FOR PROCESSING SEISMIC SIGNALS FROM LOW ENERGY SOURCES

[75] Inventors: Lincoln A. Martin, Altadena; William Franklin Fenley, Jr., Pasadena, both of Calif.

[73] Assignee: Geophysical Systems Corporation, Pasadena, Calif.

[21] Appl. No.: 617,859

[22] Filed: Sept. 29, 1975

[51] Int. Cl.² .......................... G01V 1/24; G01V 1/36
[52] U.S. Cl. ................ 340/15.5 MC; 340/15.5 CC; 340/15.5 CP; 340/15.5 DP; 360/32
[58] Field of Search .............. 340/15.5 DP, 15.5 TA, 340/15.5 CC, 15.5 SC; 235/181; 360/8, 32; 324/77 G; 181/119

[56] References Cited
U.S. PATENT DOCUMENTS

| | | | |
|---|---|---|---|
| 2,920,306 | 1/1960 | Feagin et al. | 235/181 |
| 2,981,928 | 4/1961 | Crawford | 340/15.5 TA |
| 3,571,788 | 3/1971 | Backus et al. | 340/15.5 CC |
| 3,731,268 | 5/1973 | Laudrum, Jr. | 340/15.5 TA |
| 3,883,725 | 5/1975 | Fort et al. | 340/15.5 DP |

*Primary Examiner*—Howard A. Birmiel
*Attorney, Agent, or Firm*—Daniel Silverman

[57] ABSTRACT

A system and method for carrying out seismic operations with low energy sources, which involves operating the source at spaced points along a seismic spread, the source points are spaced far enough apart so that their seismic waves originate at different points and travel by different paths to the geophones. The geophone outputs cannot be time stacked. The geophone signals are amplified at constant gain and digitized to 1 bit. If the low energy source is a vibratory source, the 1 bit signals are correlated with a 1 bit version of the sweep signal. The resulting correlograms are digitized to 1 bit and then C.D.P. stacked and displayed. If the low energy source is impulsive, the 1 bit amplified signals are C.D.P. stacked and displayed.

19 Claims, 6 Drawing Figures

METHOD AND APPARATUS FOR PROCESSING SEISMIC SIGNALS FROM LOW ENERGY SOURCES

BACKGROUND OF THE INVENTION

This invention lies in the field of seismic geophysical prospecting. More particularly it relates to the processing of seismic signals. Still more particularly it relates to the processing of seismic signals derived from low energy sources, both impulsive sources of relatively short time duration, and low energy oscillatory sources of long time duration. Still more particularly it relates to the digital processing of seismic signals from low energy sources.

In the early days of seismic exploration, the type of source used for initiation of seismic waves in the earth was an explosive material, such as dynamite. In reflection seismic operations, the dynamite charges were almost exclusively detonated in the bottom of a shallow bore hole, or shot hole, commonly of depth in the range of 50–100 feet, although at times as great at 500 feet or more. The shothole was generally filled with water to tamp the charge, that is, to couple the explosive more tightly to the earth.

The geophysicists early discovered that the surface layers of the earth were anomalous, in that they had a very low seismic propagation velocity. This led to errors in determining the travel time of the vertically travelling seismic wave through the surface layers, which was generally called the "weathered layer".

It was found that setting off a dynamite charge at the surface of the earth failed to give as much energy to a deep horizon, than if the same charge was detonated in a borehole at the base of the weathered layer. Therefore, in spite of the extra cost and time of drilling shot holes, and providing the water necessary to drill the holes, and for tamping the charges, this type of operation continued because of the need for information regarding the characteristics of the weathered layer.

This continued for many years until experiments were carried out to develop seismic sources for use on the surface of the earth. The first of these was called the "weight drop". This involved the use of a large metal block that was lifted to a selected distance above the ground (about 8–12 feet), and suddenly released, permitting it to fall and impact the earth. This impulse on the ground surface did indeed send out a seismic wave which was reflected back from subsurface geological interfaces. However, the geophone signals recorded were extremely noisy, and by the customary process of visually examining seismic records, there was no evidence of the "reflections" that were easily perceived on records recorded from high energy charges in the shot holes.

It quickly became clear, that if any use was to be made of such low energy sources as the weight drop, there must be some way to add a large number of such noisy records so as to relatively increase the signal strength and reduce the noise. Saying this in another way, the signal to noise ratio of a single record from a low energy source is very low, too low to be used by conventional visual interpretational methods.

As a result of the need to add repetitive records, a magnetic recording system was devised, which was an analog recording system. Such systems continued in general use in the industry for recording records from low energy sources. To do this, the source and geophone positions were maintained the same and the signals from successive repetitions of the source were added in time synchronism. The successive records were recorded magnetically for the same position of the source and the geophones. The name given to the process was "adding", "stacking", "time stacking", "compositing" etc. This was used with all types of weak sources, such as the weight drop, the "Vibroseis", and the "Dynoseis", and others, which subsequently came into general use.

The early stacking systems were analog magnetic recording, and remained in general use for many years. Then about 1965, there was a general change to ditigal magnetic recording of seismic signals. Such digital recording systems involved amplifiers of high gain and variable gain, until today, the latest systems involve binary-gain-ranging amplifiers that can record digitally the amplitudes of seismic signals to 16 bits.

Although the present low energy systems are applied to the surface of the earth, other means have been devised for overcoming the lack of precise velocity information in the weathered layer.

Also, about 15 years ago, there came into general use a different type of trace stacking or compositing. The stacking system previously described involved adding signals derived from the repetition of a source, where the two signals, or traces were added with their initiation times superimposed. That is, they were added in time alignment.

The new method of stacking, based on U.S. Pat. No. 2,732,906 and others, was called "Common Depth Point" or "Common Reflection Point" stacking. These are generally referred to as C.D.P. and C.R.P. stacking. In adding traces in C.D.P., the traces must be from different sources and geophones. The important criterion is that all stacked traces must be reflected from the same depth point, or subsurface reflection point. All other portions of the travel paths of the traces are different.

While both time stacking and C.D.P. stacking improved the signal to noise ratio (S/N R) by partially cancelling random noise and adding signal, C.D.P. stacking had many other advantages not possessed by time stacking. Consequently, C.D.P. stacking came into wide use with conventional high energy sources, that is, large explosive charges, where high amplitude traces were recorded. Thus it became general practice to record seismic traces to 16 bits and then to C.D.P. stack.

In C.D.P. stacking, the "fold" of the stack, that is the number of separate traces stacked to arrive at the final trace (such as two-fold, 4 fold, 12 fold etc) is very important. The larger the fold number, the better the S/N R.

C.D.P. stacking is not as simple to perform as is time stacking. In the latter simple synchronous adding of successive traces is sufficient. In C.D.P. stacking a great multiplicity of separate traces, each with different source point and geophone, must be stored digitally in a computer, and recalled in selected order. Considering that each trace is digitized at successive intervals of 0.001, 0.002, or 0.004 seconds, etc. with amplitudes recorded to 16 bits, great volumes of memory are required. For example, in Vibroseis operations, there may be 100–250 traces, or more for each record, and each record may be recorded for 10–30 seconds, digitized at say 0.004 seconds to 16 bits. This adds up, conservatively to 20 million bits per record trace. So if 20 fold operations are to be carried out, more than 400 million bits must be stored.

Therefore, while high C.D.P. fold is desirable, because of the 16 bit signals and the large storage required, it has become common practice to time stack the traces (say up to 20 times) and then process by C.D.P. stacking, it being felt that the 16 bit digitizing is important, even in view of the poorer stack obtained.

Or, to put it another way, the time stacking of the weak signals was carried over from analog operations to digital processing. The C.D.P. stacking was carried over from high energy source work, where it was standard practice to digitize to 16 bits. So now it is standard practice, with low energy sources to time stack to bring the signal amplitude up to where 16 bits is meaningful, and then to C.D.P. stack.

In the case of Vibroseis operations it has always been standard practice with digital processing to correlate the trace signals digitized to 16 bits with the sweep digitized to 16 bits.

SUMMARY OF THE INVENTION

It is a primary object of this invention in processing seismic records from low energy sources, to overcome the need for very large memory storage in high fold C.D.P. stacking, by digitizing individual traces to 1 bit, thus cutting the memory size to store 1 trace by a factor of about 1/16, thus making it possible to multiply the C.D.P. fold by a factor of about 16 for the same total size of memory required.

It is a further object of this invention to process seismic records from low energy sources such as Vibroseis, by;

a. initiating each seismic wave at a different spaced source point;

b. recording seismic traces to 1 bit;

c. correlating the 1 bit trace with a 1 bit digitization of the sweep, to obtain a multi-bit correlated trace, digitizing the correlogram to 1 bit, and d. C.D.P. stacking the 1 bit correlated traces.

These and other objects are realized and the limitations of the prior art are overcome in this invention by eliminating the time stacking of the low energy signals, and digitizing the detected signals to 1 bit, to provide multi-bit correlated traces, which are then digitized to 1 bit, stored, and C.D.P. stacked.

BRIEF DESCRIPTION OF THE DRAWINGS

These and other objects and advantages of this invention and a better understanding of the principles and details of the invention will be evident from the following description taken in conjunction with the appended drawings, in which.

DESCRIPTION OF THE PREFERRED EMBODIMENT

Figure 1:
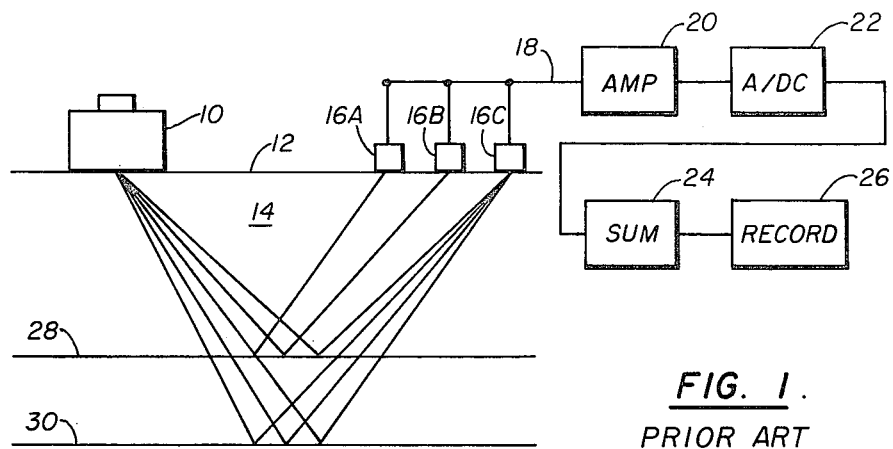
FIG. 1 illustrates the prior art normal seismic field system.

Referring now to the drawings, there is shown in FIG. 1 a conventional prior art seismic system involving a low energy source, such as a weight drop, Dynoseis, Vibroseis, or other suitable low energy source, including a low energy explosive shot on the surface of the earth.

While this invention can be used with both impulsive sources of short time duration and oscillatory sources of relatively long time duration, it is most valuable for the latter systems, such as Vibroseis, particularly because of the large memory storage required in the acquisition of multi-bit composited uncorrelated data.

There is a seismic source 10, which will, for convenience be considered to be a vibrator source, controlled by an oscillatory sweep signal, of selected frequency band width, and selected time duration. The vibrator 10 is applied to the surface 12 of the earth 14 in the customary manner. Generally a plurality of vibrators, generally 3 or 4 or more are used, although only one is shown. All the vibrators are driven in synchronism by the same sweep signal, the purpose being to multiply the seismic energy imparted to the earth, in proportion to the number of vibrators. Since the vibrators are driven as a single source, they are placed in close proximity to each other, and together represent a single source point.

A plurality of spaced geophones, or other vibration detectors are positioned at or near the surface 12 of the earth. They are connected by cables 18 to a corresponding plurality of variable gain amplifiers 20, as is well known in the art.

The art of seismic amplifiers has developed over the past 40 years or so, in the direction of higher gain and higher fidelity. More recently they have included binary-gain-ranging amplifiers, to provide a high amplitude of signal, of known binary gain at all times. Generally these amplifiers are digitized to 16 or more bits.

The outputs of the amplifiers go to apparatus, indicated for simplicity as analog to digital converter 22, for converting the analog output signal to a digital signal. Generally this apparatus will involve multiplexing and analog to digital conversion as is well known in the art. The signals then go to a summer 24, which is a magnetic recording device, available on the market for adding, or compositing, or stacking seismic traces. Generally 10-20 or more repetitions of the vibrator sweeps are carried out, and the corresponding trace signals are added in the summer. At any one time, the signal stored in the summer is the sum of all repetitions of the sweep for the particular position of the vibrators. While the vibrators do move a short distance (such as 10-20 feet) between repetitions, this is mainly to have a fresh earth surface for each sweep, so that successive seismic waves generated will be the same. However, the distance travelled between sweeps is small compared to the spacing between geophone groups, or traces on the ground. The summed record is then recorded on magnetic tape for further processing.

To summarize the description of FIG. 1;

1. the multiple vibrators are driven in synchronism with the same sweep signal, 2. the vibrators are closely spaced, and move between successive sweeps only a short distance, so that all sweeps can be considered as originating at a single source point, 3. the geophone signals are amplified with a variable gain amplifier, and the amplitudes are digitized at successive digitizing intervals to 16 bits, 4. the geophone signals from successive sweeps from the same source point are stacked in time synchronization.

Figure 2:
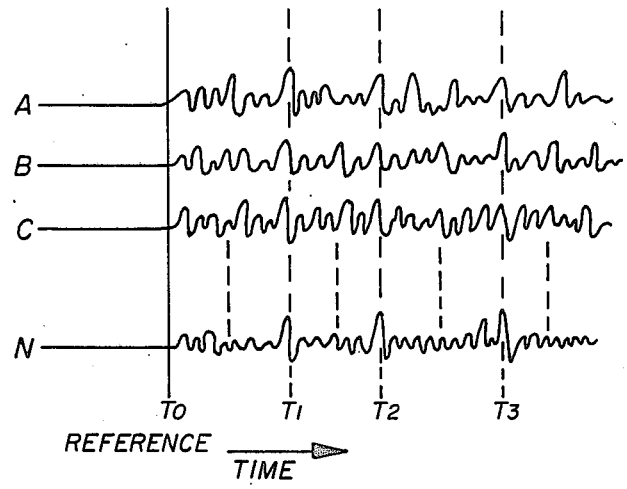
FIG. 2 illustrates the prior art time stacking.

The summing action in the time stacking process is indicated in FIG. 2. There are a plurality of separate traces indicated as A, B, C, . . . N. These are shown as analog traces, for convenience. Although time stacking was originally done in analog form, today, the conventional practice is to use the digital summer, after the traces are digitized.

Because of the weak (low energy) source, the detected traces A, B, C, . . . N are of poor signal to noise ratio, and the noise masks whatever signal (reflection events) may be present. However, by adding the traces a sum, or stacked trace S is derived, in which the random noise has been reduced and the signal enhanced. Thus in the sum trace S, the individual reflection events at times T1 T2, and T3 are now obvious over the noise. It will be clear that in time stacking, the traces are added at each value of time after the time reference To.

Figure 3:
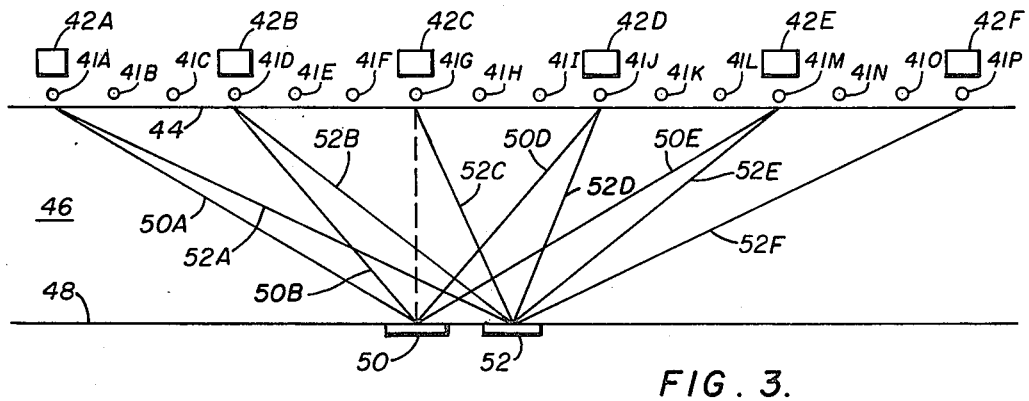
FIG. 3 illustrates the prior art C.D.P. stacking.

Referring to FIG. 3, there is shown another method of stacking traces. It is called common reflection point, or common depth point stacking. Shown are a plurality of geophone groups 41A, 41B, . . . 41P arrayed along a survey line on the surface 44 of the earth 46. A reflection horizon 48 is shown. A vibrator (or group of vibrators) operates successively along the survey line at positions every third geophone group, for example. With the vibrator at position 42A, which coincides with geophone position 41A, seismic wave energy may go by path 50A to reflecting area or depth point 50, and then be reflected upward to geophone 41M. Also energy may go by path 52A to depth point 52, and then be reflected upward to geophone group 41P, etc. Similarly, when the vibrator 42B is at geophone position 41D, it will send seismic wave energy to depth point 50 by path 50B, and point 52 by path 52B etc. and the reflected energy wil go by paths 50D to geophone 41J, and path 52E to geophone 41M, etc.

It will be seen that the path 42B, 50B, 50, 50D, and 41J, and the path 42A, 50A, 50, 50 and 41M have something in common; they are both reflected at a common depth point 50. By adding the signals or traces travelling by these two paths, they are C.D.P. stacked. This kind of stacking not only cancels out random noise, it cancels out other types of unwanted signals, such as multiple reflections, etc. Therefore, where it can be done, C.D.P. stacking is much preferable to time stacking.

Figure 4:
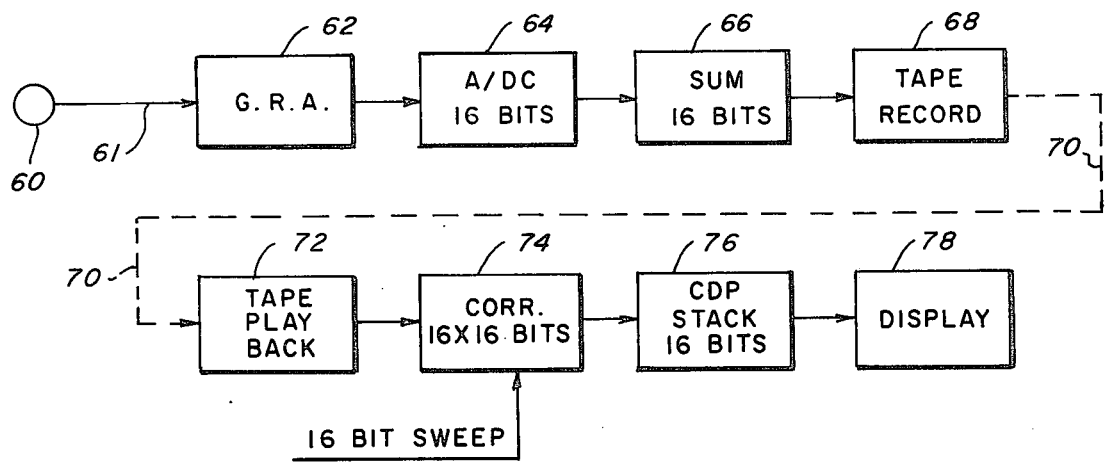
FIG. 4 illustrates the prior art seismic recording and processing systems.

Consider FIG. 4, which is a block diagram of a conventional vibroseis type of seismic recording and processing system. The geophone group 60 is connected by cable 61 to its gain ranging amplifier 62 and to an analog/digital converter 64, and, as a 16 bit word, it goes to a digital summer, or time stacker 66, and to a recorder 68. This is generally a magnetic tape, which then is carried to a processing computer, by dashed path 70 to a tape playback 72. The summed, or added, or stacked, signals are then correlated in a 16 bit × 16 bit correlator 74, against a 16 bit sweep signal from lead 75. The correlated signals of 16 bits are then C.D.P. stacked in stacker 76, and displayed 78.

In reviewing the prior art status of the seismic prospecting industry above, the process can be simply stated as:
a. gain ranging amplification,
b. digitization to 16 bits,
c. time stacking successive repetitions;
d. correlation to 16 × 16 bits,
e. C.D.P. stacking, and
f. display.

We have found that by detecting the original geophone signals and digitizing them to 1 bit, and correlating the 1 bit signals with a 1 bit version of the sweep signal, and digitizing the resulting correlogram to 1 bit, a 1 bit correlation trace is provided. Now, by C.D.P. stacking the successive correlation traces, a stacked record is provided which can achieve a signal to noise ratio higher than that provided by the prior art systems, due to the potential for higher fold C.D.P. stacking.

Figure 5:
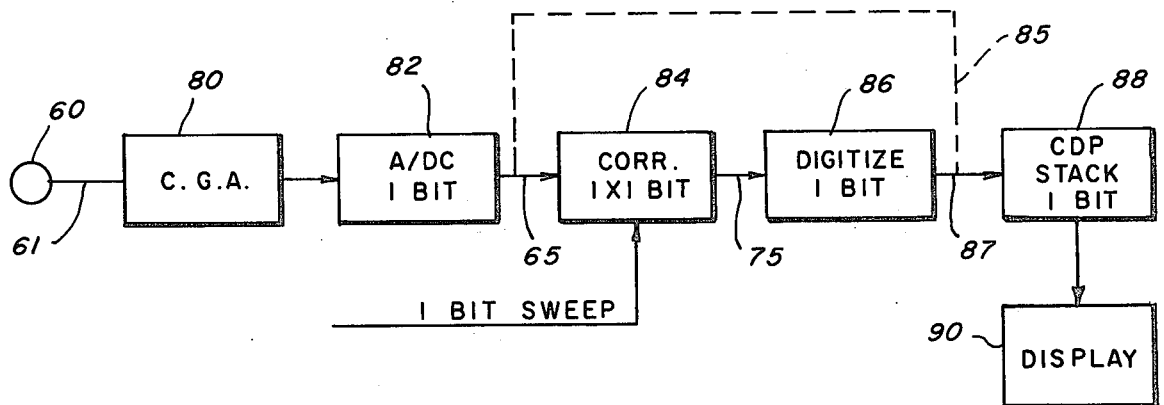
FIG. 5 illustrates the preferred embodiment of the seismic recording and processing system of this invention.

Our improved system is illustrated in FIG. 5. The geophone group 60 signal on lead 61 goes to a constant gain amplifier 80. The output of the amplifier 80 goes to a 1 bit digitizer in the A/D box 82. The 1 bit digitized signal is correlated in 84 against a 1 bit version of the sweep on lead 85, to provide a multi bit correlated trace on lead 87. This multi bit trace is then digitized to 1 bit in 86. The 1 bit correlated traces are then C.D.P. stacked in 88 and displayed 90. If the source is impulsive, the 1 bit signal then by-passes the correlator 84, and goes by way of 65,85, and 87 to the C.D.P. stack.

Figure 6:
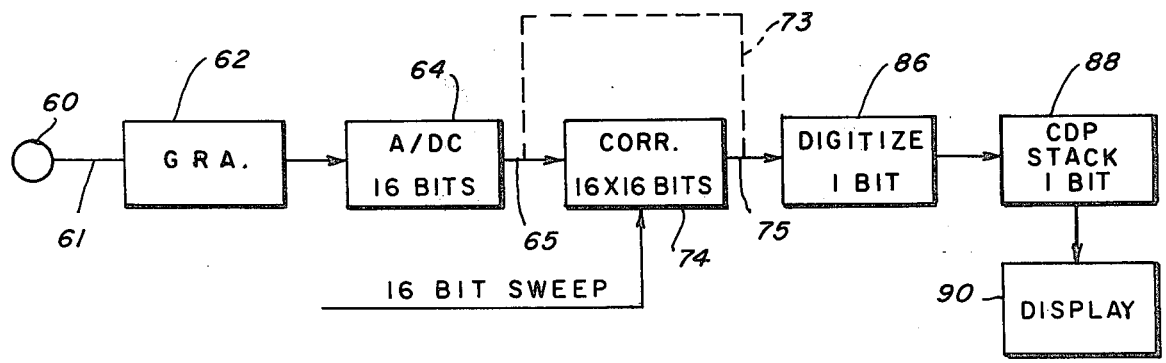
FIG. 6 illustrates a combination of prior art 16 bit recording and correlation with 1 bit C.D.P. stacking.

Shown in FIG. 6 is a combination of FIGS. 4 and 5. This provides for the geophones 60 to transmit their signals 61 to a conventional multibit (GRA) amplifier 62. The signals are then digitized to multi bits (16 bits) in 64.

If the source is impulsive, the signals then pass by way of 65 dashed line 73, and 75 to 86 where they are digitized to 1 bit.

If the source is vibratory, the 16 bit signals from 64 go by way of 65 to a 16 × 16 bit correlator 74, and by way of 75 to 86 to be digitized to 1 bit. The 1 bit signals are C.D.P. stacked in 88 and then displayed 90, in a conventional manner.

In important part of this invention is the reduction (to zero if possible) of straight stacking, and the increase to high fold C.D.P. stacking. By high fold we mean, in the range of 40 to 50 or more up to many hundreds. To handle this high fold C.D.P, it becomes essential to to reduce the multi-bit signals to 1 bit for storage and gather.

Since the signals are to be digitized to 1 bit before C.D.P. stack, it seems to be more logical to follow FIG. 5 rather than FIG. 6, for both impulsive and vibratory signals. The digitizer 86 is required, since in the correlation process, even though 1 bit signals are correlated, the summing action provides multibit correlograms. For conventional computers which handle 16 bit words, there is no speed advantage in correlating 1 bit words, since they must be filled out to 16 bits. However, with special equipment, the 1 bit signals could be correlated more rapidly than the 16 bit signals.

Why wasn't this system discovered earlier? The reason, we believe, is that the seismic industry believed too strongly that the best amplifier system, for use in seismic recording was one that had the widest range of recording without distortion, and a true amplitude measurement at all times. This concept was carried over even to the records recorded from low energy sources, even though the records contained very low signal amplitude.

It was not until Fort et al (U.S. Pat. No. 3,883,725) discovered that it was possible to record seismic records to 1 bit and by stacking a selected number of repetitions, that it was possible to provide a final record undistinguishable from the conventional record using 16 bit recording. Also, the seismic industry believed and still believes that the correlation of seismic records must be made between two 16 bit signals.

We have discovered that it is possible to correlate the 1 bit record trace with a 1 bit sweep, to get the same final records, provided that there are the same number of repetitions or stacks.

This 1 bit × 1 bit correlation and the storage of all traces as 1 bit signals makes it possible to do all the stacking in the C.D.P. mode, and thereby to obtain a greater benefit in S/N R, reduction of interference from multiple reflections, and other benefits, without any greater cost in apparatus or time, than in the conventional system.

Of course, our system, as shown in FIG. 5 permits great simplification in the field data gathering system, such as elimination of the gain ranging amplifier and digitizer. However, this forms no part of our invention, and was discovered by Fort et al.

Our system also eliminates the summer as conventionally used. Also, the simplification taught by Fort et al permits inclusion in the field recording instruments of a minicomputer and peripheral equipment so that the recorder and playback 68,72 can, in effect, be eliminated. This permits the correlations to be made on line, as the traces are recorded, because the 1 bit × 1 bit correlation is so fast.

However, the main improvement is the high fold of C.D.P. stacking permitted with no greater memory required, because of the 1 bit correlated signals handled. This high fold C.D.P. stacking provides great improvement in the record quality.

In review, this invention is based primarily on two facts, on our discovery that correlation of seismic signals can be made with 1 bit signal and 1 bit sweep, and the resulting correlograms can be digitized to 1 bit, to provide equal or better final records, provided that the same number of repetitions of the source are provided. This then leads to the second point, namely, that by operating the source in a C.D.P. stacking format, that is, by moving the source to spaced positions between sweeps, the high fold of C.D.P. stacking can be provided.

While this method is ideal for Vibroseis type of operation, it is equally useful to impulsive source operations, and even with high energy sources.

In current high energy source operations, it is customary to do C.D.P. stacking on the received signals. However, because of the 16 bit digitization of the signals, the practical limitations of storage, and the expense of computer operations in performing the C.D.P. stacking, the number of fold is usually quite limited, such as for example, 6 fold, 12 fold, or as much as 24 fold. However, in this invention, with the handling of signals digitized to one bit, it should be possible to handle of the order of 15 or 16 times as many fold. Thus, in this invention we envision using as many as 50 to 500 fold C.D.P. stacking, without any larger computer or storage capacity, and at less cost.

While we have described the operation of C.D.P. stacking in terms of a linear array of geophones, this was only for the purpose of illustration and convenience. It is well known that C.D.P. stacking can be done with 2-dimensional arrays of geophones and/or sources, and the principles of this invention are applicable to C.D.P. stacking in seismic operations for all possible arrays.

While our invention has been described with a certain degree of particularity, it is manifest that many changes may be made in the details of construction and the arrangement of components and details of operation, It is understood that the invention is not to be limited to the specific language used or the specific embodiments set forth herein by way of exemplification of the invention, but the invention is to be limited only by the scope of the attached claim or claims, including the full range of equivalence to which each element or step thereof is entitled.

What is claimed is:

1. In a seismic prospecting system, having;
   a. a low energy seismic source;
   b. a plurality of geophones at spaced positions distant from said source;
   c. means to amplify and digitize the geophone signals; the method of operation and processing the seismic data comprising;
      1. operating said source in C.D.P. format, whereby each source operation is at a different spaced-apart independent position;
      2. amplifying and digitizing the geophone signals to 1 bit;
      3. C.D.P. stacking said 1 bit digitized signals; and wherein
      4. the C.D.P. fold is at least 40.

2. The method as in claim 1 in which said source is a vibratory source, and including the steps between steps (2) and (3) of correlating said 1 bit digitized signals with a 1 bit digitized version of the reference signal that drives the vibrator; and digitizing the resulting correlograms to 1 bit, to form 1 bit digitized signals.

3. The method as in claim 1 in which said low energy source is a vibratory source driven by an oscillatory sweep signal of selected frequency band width and time duration.

4. The method as in claim 1 in which said low energy source is a weight drop source.

5. The method as in claim 1 in which said source is a gas exploder type of source.

6. The method as in claim 1 in which said source is a small explosive charge detonated near the surface of the earth.

7. The method as in claim 1 in which said source comprises a plurality of low energy sources, positioned at the same source point, and synchronized in time.

8. The method as in claim 1 including the steps of repeating said source at least a second time at each of the C.D.P. source positions, straight stacking the 1 bit digitized geophone signals resulting from the first and said repeated source, and digitizing said stacked signals to 1 bit to form 1 bit digitized signals.

9. The method as in claim 1 in which the C.D.P. fold number is at least 100.

10. The method as in claim 1 in which the C.D.P. fold number of the C.D.P. stack is at least 50.

11. The method as in claim 1 in which said geophones and sources are in a linear array.

12. The method as in claim 1 in which said geophones and said sources are in a 2-dimensional array.

13. In a seismic prospecting system having;
   a. a vibratory source driven by a reference sweep signal;
   b. a plurality of geophones at spaced positions distant from said source;
   c. and means to amplify and digitize the geophone signals; the method of operation and processing the seismic data, comprising;
      1. operating said source in C.D.P. format, whereby each source operation is at a different spaced-apart independent position;

2. amplifying and digitizing said received signals to form a 1 bit received signal;
3. digitizing said reference sweep signal;
4. correlating each 1 bit received signal with said digitized reference sweep signal to form multi bit correlograms;
5. digitizing said correlograms to 1 bit; and
6. C.D.P. stacking said 1 bit digitized correlograms; and wherein
7. the C.D.P. fold is at least 40.

14. The method as in claim 13 in which said steps (2), (3) and (4) comprise;
digitizing said received signal to multi bit words;
digitizing said reference sweep signal to multi bit words;
correlating said multi bit signal and reference sweep.

15. The method as in claim 13 in which said steps (2), (3) and (4) comprise;
digitizing said received signal to 1 bit;
digitizing said reference sweep signal to 1 bit;
correlating said 1 bit signal and reference sweep signal.

16. The method as in claim 13 including the additional steps, at each C.D.P. source point, of repeating said source at least once, and straight stacking the at least two received signals to form a straight stacked trace, and digitizing said stacked trace to 1 bit, to form a 1 bit received signal.

17. The method as in claim 13 in which the C.D.P. fold number is at least 50.

18. The method as in claim 10 in which the number of separate channels is at least 100.

19. In a seismic prospecting system, having;
a. a strong seismic source;
b. a plurality of geophones at spaced positions distant from said source;
c. and means to amplify and digitize the geophone signals; the method of operation and processing the seismic data comprising;
1. operating said source in C.D.P. format, whereby each source operation is at a different spaced-apart independent position;
2. amplifyng and digitizing the geophone signals to 1 bit;
3. C.D.P. stacking said 1 bit digitized signals; and wherein
4. the C.D.P. fold is at least 40, and
5. the number of channels is at least 80.

* * * * *